(12) United States Patent
 Hara

(10) Patent No.: US 12,132,174 B2
(45) Date of Patent: Oct. 29, 2024

(54) SECONDARY BATTERY

(71) Applicant: PRIME PLANET ENERGY & SOLUTIONS, INC., Tokyo (JP)

(72) Inventor: Takeru Hara, Toyota (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 52 days.

(21) Appl. No.: 17/675,099

(22) Filed: Feb. 18, 2022

(65) Prior Publication Data
US 2022/0294021 A1    Sep. 15, 2022

(30) Foreign Application Priority Data

Mar. 12, 2021   (JP) ................. 2021-039916

(51) Int. Cl.
| H01M 4/04 | (2006.01) |
| H01M 10/0585 | (2010.01) |
| H01M 10/0587 | (2010.01) |
| H01M 10/615 | (2014.01) |
| H01M 50/103 | (2021.01) |
| H01M 50/593 | (2021.01) |

(52) U.S. Cl.
CPC ..... *H01M 10/0587* (2013.01); *H01M 4/0471* (2013.01); *H01M 10/0585* (2013.01); *H01M 10/615* (2015.04); *H01M 50/103* (2021.01); *H01M 50/593* (2021.01)

(58) Field of Classification Search
CPC ........ H01M 10/0587; H01M 10/0585; H01M 10/615; H01M 50/103; H01M 4/0471
See application file for complete search history.

(56) References Cited

U.S. PATENT DOCUMENTS

| 2010/0055559 A1* | 3/2010 | Hirai ................. H01M 10/0436 429/162 |
| 2012/0301779 A1 | 11/2012 | Munenaga et al. |
| 2015/0093620 A1 | 4/2015 | Miyazaki et al. |
| 2020/0212384 A1* | 7/2020 | Baumann ............ H01M 50/213 |

FOREIGN PATENT DOCUMENTS

| CN | 107919443 A | 4/2018 |
| EP | 2 426 752 A2 | 3/2012 |
| JP | 2010-287456 A | 12/2010 |
| JP | 2011-134685 A | 7/2011 |
| JP | 2013-008665 A | 1/2013 |
| JP | 2013-149400 A | 8/2013 |

(Continued)

*Primary Examiner* — Kenneth J Douyette
(74) *Attorney, Agent, or Firm* — Finnegan, Henderson, Farabow, Garrett, and Dunner, LLP

(57) ABSTRACT

Provided is a technique capable of suppressing the occurrence of uneven drying inside an electrode body. A secondary battery disclosed herein includes an electrode body and a battery case. The battery case has a pair of rectangular wide surfaces and four rectangular side surfaces between the pair of wide surfaces. The electrode body is accommodated in the battery case, wherein rectangular surfaces of the electrode body face the wide surfaces of the battery case. The battery case is provided with protrusions inside, and the protrusions are in contact with at least a part of a central region including a center line in the long side direction of the rectangular surfaces of the electrode body accommodated in the battery case.

6 Claims, 5 Drawing Sheets

(56) References Cited

FOREIGN PATENT DOCUMENTS

| | | |
|---|---|---|
| JP | 2013-246892 A | 12/2013 |
| JP | 2015-092460 A | 5/2015 |
| JP | 2016-110716 A | 6/2016 |
| JP | 2018-006261 A | 1/2018 |
| WO | WO 2021/193326 A1 | 9/2021 |

* cited by examiner

SECONDARY BATTERY

CROSS REFERENCE TO RELATED APPLICATIONS

This application claims priority based on Japanese Patent Application No. 2021-039916 filed on Mar. 12, 2021, and the entire contents of the application are incorporated herein by reference.

BACKGROUND OF THE DISCLOSURE

1. Technical Field

The present invention relates to a secondary battery.

2. Background

Currently, secondary batteries such as lithium ion secondary batteries and nickel-hydrogen batteries are widely used in various fields such as vehicles and mobile terminals. A typical example of this kind of secondary battery is configured to include an electrode body provided with a positive electrode, a negative electrode, and a separator that separates the positive electrode and the negative electrode, and a battery case that accommodates the electrode body.

Japanese Patent Application Publication No. 2018-6261 describes an example of a method for manufacturing a secondary battery having such a configuration. The patent publication describes a step of drying the inside of a battery assembly in a state where an electrode body is accommodated in a battery case and an electrolytic solution is not injected. The manufacturing method disclosed in the patent publication includes: an arrangement step of arranging a battery assembly in a state where an electrode body is accommodated in a battery case in a vacuum drying furnace; a drying step of raising the temperature and reducing the pressure inside the vacuum drying furnace to dry the battery assembly; and a pressurizing step of increasing the pressure inside the vacuum drying furnace after the battery assembly is dried.

SUMMARY OF THE INVENTION

However, where the inside of the electrode body is unevenly dried in the drying of the battery assembly as described above, it may cause undesirable unevenness in current distribution and potential distribution.

The present invention has been created to solve such a problem, and an object of the present invention is to provide a technique capable of suppressing the occurrence of uneven drying inside an electrode body.

The secondary battery disclosed herein comprises an electrode body provided with a positive electrode, a negative electrode, and a separator that separates the positive electrode and the negative electrode and comprising at least a pair of rectangular surfaces, and a battery case that accommodates the electrode body. The battery case is formed in a hexagonal box shape having a pair of rectangular wide surfaces and four rectangular side surfaces between the pair of wide surfaces. The electrode body is accommodated in the battery case so that the rectangular surfaces of the electrode body face the wide surfaces of the battery case. Here, the battery case is provided with a protrusion inside, and the protrusion is in contact with at least a part of a central region including a center line in the long side direction of the rectangular surface of the electrode body accommodated in the battery case.

The study conducted by the present inventor made it clear that moisture tends to remain in the central region of the electrode body in the drying step of a battery assembly. The secondary battery is provided with a protrusion that contacts at least a part of the central region inside the battery case. As a result, in the drying step of the battery assembly, the heat transfer efficiency to the central region can be improved. Therefore, it is possible to promote the removal of moisture from the central region and suppress the occurrence of uneven drying inside the electrode body.

In a preferred embodiment of the secondary battery disclosed herein, the ratio (L2/L1) of the length L2 in the long side direction of the central region to the length L1 in the long side direction of the rectangular surface of the electrode body is ⅛ or more and ½ or less. In a configuration in which the ratio (L2/L1) is set to be within the above range, the effects of the technique disclosed herein can be adequately realized.

In another preferred embodiment of the secondary battery disclosed herein, the length L1 is 100 mm or more. The effect of the technique disclosed herein can be preferably exerted when drying a battery assembly having an electrode body with a length L1 of 100 mm or more.

In another preferred embodiment of the secondary battery disclosed herein, the positive electrode is a long strip-shaped positive electrode sheet, and the negative electrode is a long strip-shaped negative electrode sheet. The electrode body is a wound electrode body in which the positive electrode sheet and the negative electrode sheet are laminated with the separator interposed therebetween and are wound around a winding axis orthogonal to the longitudinal direction of the sheets. Here, the laminated surfaces of the positive electrode sheet, the negative electrode sheet, and the separator are open to the outside of the electrode body from both ends in the winding axis direction. In the drying of the wound electrode body having the above configuration, the moisture in the electrode body goes out from the open laminated surface, so that uneven drying is likely to occur in the wound electrode body. The effect of the technique disclosed herein can be preferably exerted when the battery assembly having the wound electrode body is dried.

In another preferred embodiment of the secondary battery disclosed herein, a plurality of the electrode bodies is provided. The plurality of the electrode bodies are accommodated in the battery case in a state of being arranged in a predetermined direction. The protrusions are in contact with the electrode bodies at bath ends in the arrangement direction. The effect of the technique disclosed herein can be adequately exerted even when the battery assembly including the plurality of electrode bodies is dried.

In another preferred embodiment of the secondary battery disclosed herein, an insert member is provided between the electrode bodies. The insert member is in contact with at least a part of the central region of the electrode body adjacent to the insert member. With such a configuration, the heat transfer efficiency to the central region of the electrode body can be further enhanced by providing the insert member between the electrode bodies.

DETAILED DESCRIPTION OF THE PREFERRED EMBODIMENTS

Hereinafter, some preferred embodiments of the technique disclosed herein will be described with reference to the drawings. It should be noted that matters other than those specifically mentioned in the present description and necessary for carrying out the present invention (for example, general configuration and manufacturing process of the secondary battery that do not characterize the technique disclosed herein) can be ascertained as design matters for a person skilled in the art that are based on the related art in the field. The technique disclosed herein can be implemented based on the contents disclosed in the present description and the common technical knowledge in the art.

In the present description, the "secondary battery" is a term that refers to a general power storage device capable of repeatedly charging and discharging, and is a concept inclusive of a so-called storage battery (chemical battery) such as a lithium ion secondary battery or a nickel hydrogen battery, and a capacitor (physical battery) such as an electric double layer capacitor.

In each figure referred to in the present description, reference symbol X indicates a "depth direction", reference symbol Y indicates a "width direction", and reference symbol Z indicates a "height direction". Further, F in the depth direction X indicates "front" and Rr indicates "rear". L in the width direction Y indicates "left" and R indicates "right". Then, U in the height direction Z indicates "upper" and D indicates "lower". However, these are merely directions for convenience of explanation, and do not limit in any way the installation form of the secondary battery.

FIRST EMBODIMENT

Figure 1:
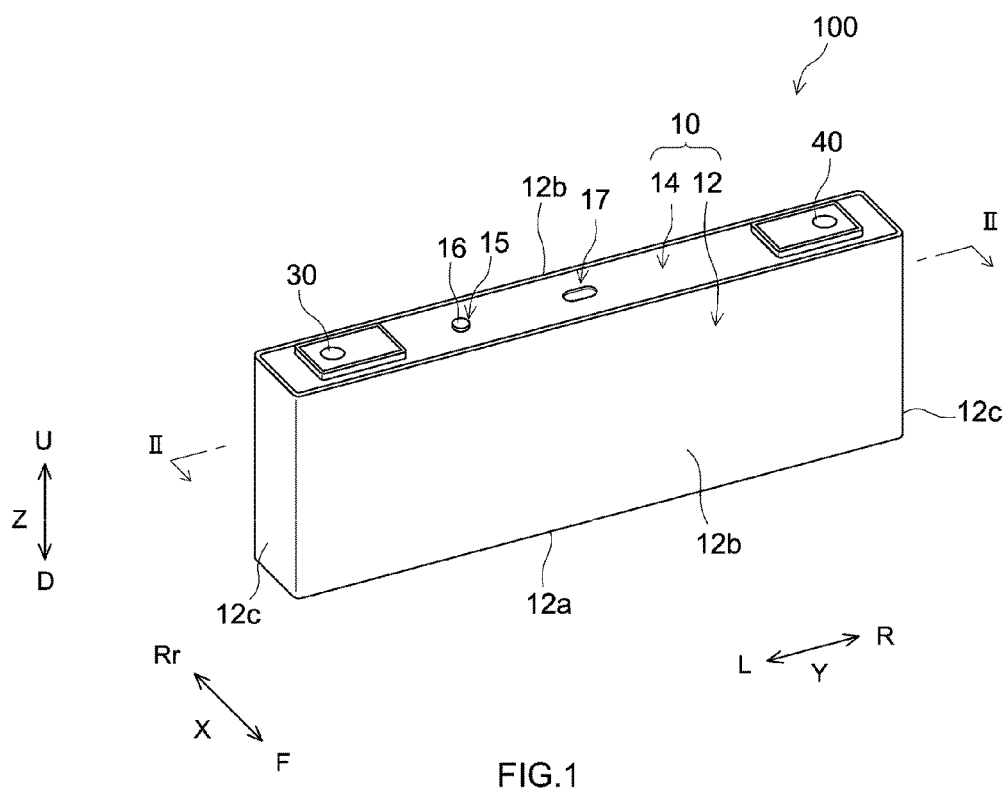
FIG. 1 is a perspective view schematically showing a secondary battery according to the first embodiment.
Figure 2:
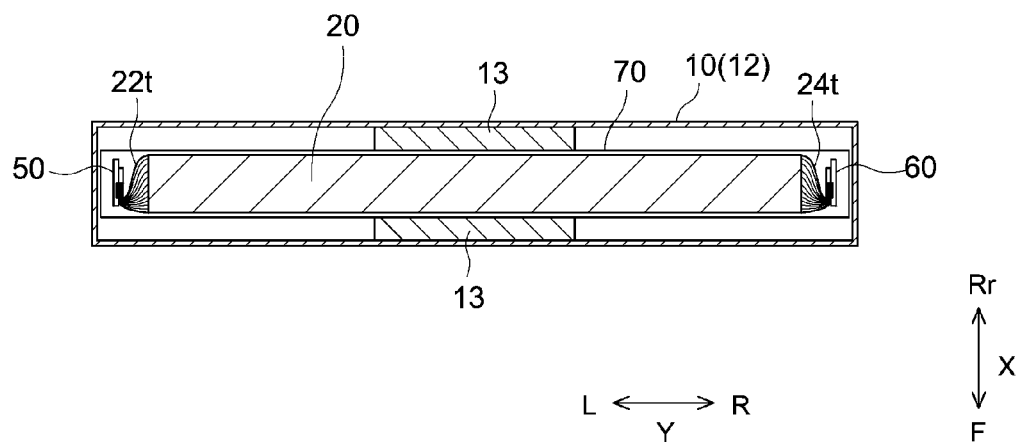
FIG. 2 is a schematic cross-sectional view taken along the line II-II in FIG. 1.

An example of the secondary battery disclosed herein is shown in FIGS. 1 and 2. FIG. 1 is a perspective view schematically showing a secondary battery according to the first embodiment. FIG. 2 is a schematic cross-sectional view taken along the line II-II in FIG. 1. The secondary battery 100 includes an electrode body 20, an electrode body holder 70 that covers the electrode body 20, an electrolytic solution (not shown), and a battery case 10 that accommodates the electrode body, the electrode body holder, and the electrolytic solution. The secondary battery 100 is herein a lithium ion secondary battery. As the electrolytic solution, those that can be used in this kind of secondary battery can be used without particular limitation, and the technique disclosed herein is not characterized thereby, so detailed description thereof will be omitted.

The battery case 10 includes a case body 12 having an opening and a lid 14 that closes the opening. The battery case 10 is integrated and airtightly sealed (hermetically closed) by joining the lid 14 to the peripheral edge of the opening of the case body 12, The lid 14 is provided with a liquid injection hole 15, a safety valve 17, a positive electrode external terminal 30, and a negative electrode external terminal 40. The liquid injection hole 15 is a hole for injecting an electrolytic solution into the battery case 10, and is sealed by a sealing plug 16. The safety vale 17 is a thin-walled portion configured to break and release the gas inside the battery case 10 to the outside when the pressure inside the battery case 10 exceeds a predetermined value. The positive electrode external terminal 30 and the negative electrode external terminal 40 are electrically connected to the electrode body accommodated in the battery case 10.

The battery case 10 is formed in a hexagonal box shape having a pair of rectangular wide surfaces 12b and four rectangular side surfaces between the pair of wide surfaces 12b. The battery case 10 has a pair of rectangular wide surfaces 12b, a rectangular bottom surface 12a, and a pair of rectangular narrow surfaces 12c. That is, in FIG. 1, three of the four rectangular side surfaces are composed of the bottom surface 12a and the pair of narrow surfaces 12c, and the remaining rectangular side surface is composed of a lid 14.

As shown in FIG. 2, the battery case 10 is provided with protrusions 13 inside. The protrusions 13 are in contact with the electrode body 20 (specifically, at least a part of the central region described hereinbelow) accommodated in the battery case 10. The protrusions 13 are arranged on both the F side and the Rr side in the depth direction X with the electrode body 20 interposed therebetween, and are in contact with the electrode body 20 from both sides. Further, "in contact with the electrode body 20" is inclusive of contacting with the electrode body 20 in a state of being covered with the electrode body holder 70.

The battery case 10 is made of, for example, a metal. Examples of the metal material constituting the battery case 10 include aluminum, aluminum alloy, iron, iron alloy, and the like.

Figure 3:
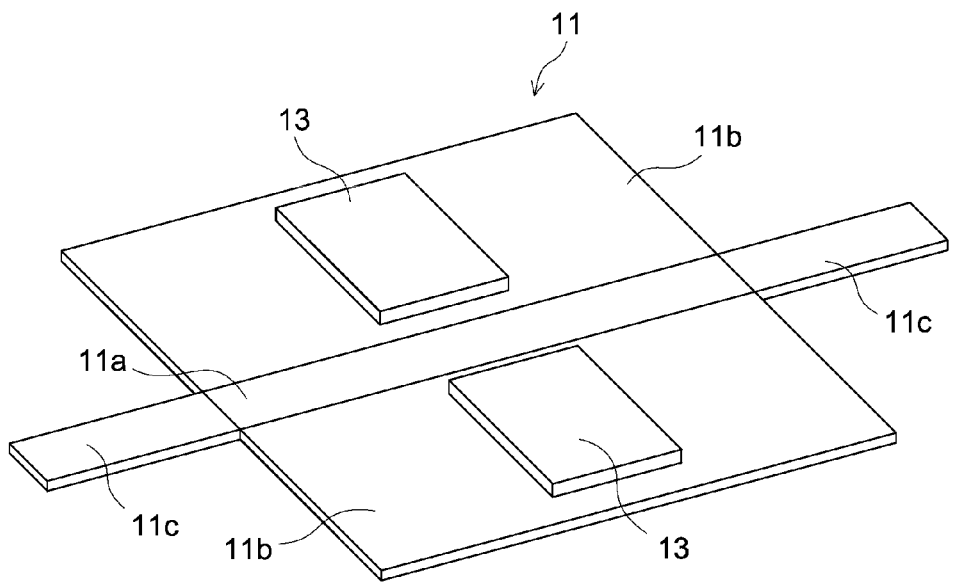
FIG. 3 is a perspective view of the case body of the secondary battery according to the first embodiment in an unfolded state.

FIG. 3 shows an example of the configuration of the case body 12. The figure is a perspective view of the case body of the secondary battery according to the first embodiment in an unfolded state. The case body 12 is formed of a single plate material 11 such as shown in FIG. 3. The plate material 11 has one bottom surface portion 11a, two wide surface portions 11b, and two narrow surface portions 11c. The two wide surface portions 11b are both on the long side of the bottom surface portion 11a and are adjacent to the bottom surface portion 11a. The two narrow surface portions 11c are both on the short side of the bottom surface portion 11a and are adjacent to the narrow surface portion 11c. The bottom surface portion 11a is a component of the bottom surface 12a of the case body 12, and has a rectangular shape. As shown in FIGS. 1 and 3, when the wide surface portion 11b is bent along the long side of the bottom surface portion 11a, the wide surface 12b rising from the bottom surface 12a of the case body 12 is formed. When the narrow surface portion 11c is bent along the short side of the bottom surface portion 11a, the narrow surface 12c rising from the bottom surface 12a of the case body 12 is formed. Then, after bending as described above, the case body 12 is obtained by welding the short side of the wide surface portion 11b and the long side of the narrow surface portion 11c.

The protrusions 13 are formed on the wide surface portion 11b of the plate material 11. For example, the protrusion 13 is a separate material from the plate material 11, and the protrusion 13 and the plate material 11 can be integrated by joining the material (for example, a plate material) constituting the protrusion 13 and the wide surface portion 111. When the wide surface portion 11b is bent as described above, the protrusion is formed on the wide surface 12b of the case body 12 (see FIG. 2), The protrusion 13 is made, for example, of a metal. The material of the protrusion 13 may be the same as or different from the constituent material of the plate material 11. Further, the joining method between the plate material 11 and the protrusion 13 is not particularly limited, and conventionally known methods such as laser welding, ultrasonic bonding, and resistance welding may be used. The thickness of the protrusion 13 can be set, as appropriate, so as to enable contact with the electrode body 20.

The forming area of the protrusion 13 on the wide surface portion 11b can be set so that the contact area with the central region of the electrode body 20 is within a predetermined range. Here, when the area of the central region is 100%, the contact area can be 40% or more, for example, 50% or more, preferably 60% or more, more preferably 70% or more, even more preferably 80% or more, and the closer to 100% (for example, 90% or more, or 95% or more) the better.

The shape of the protrusion 13 is not particularly limited as long as it is formed so as to realize the above contact area. The protrusion 13 may have a flat rectangular shape as shown in FIG. 3, and may have other shapes such as a dot shape and a rib structure.

Figure 4:
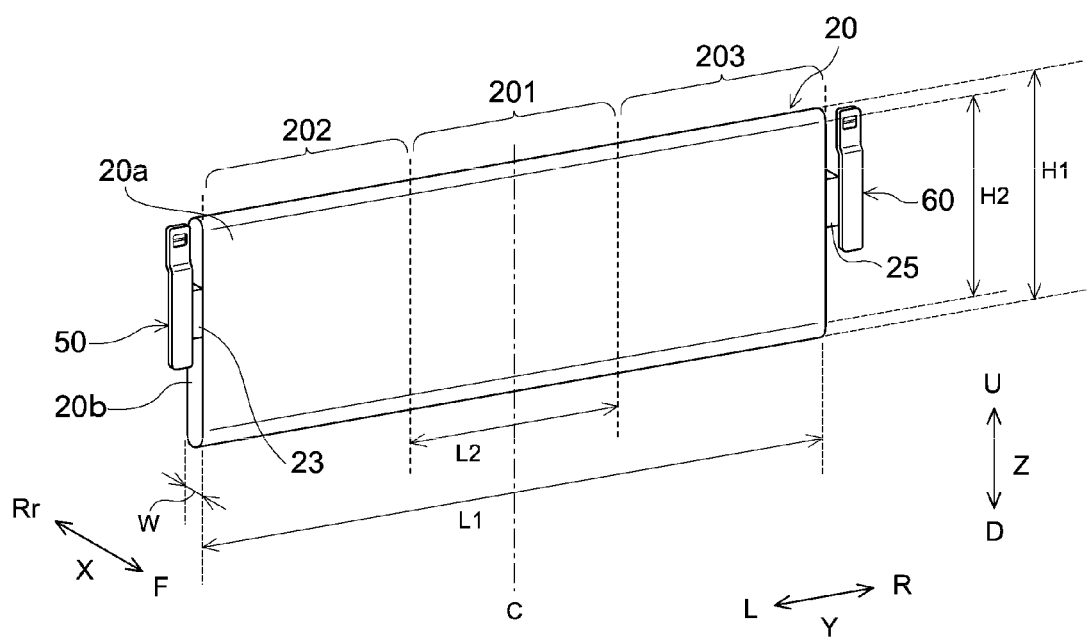
FIG. 4 is a perspective view schematically showing an electrode body of the secondary battery according to the first embodiment.
Figure 5:
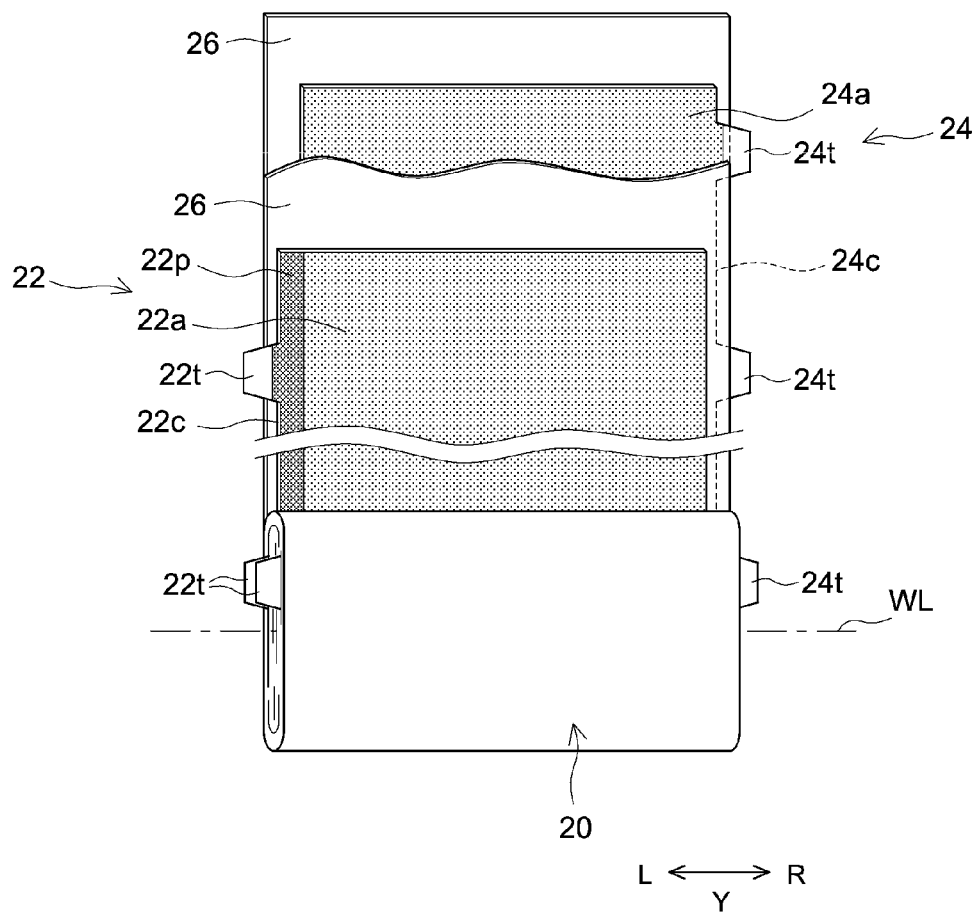
FIG. 5 is a schematic view showing the configuration of the electrode body of the secondary battery according to the first embodiment.

The electrode body 20 is a power generation element of the secondary battery 100, and includes a positive electrode, a negative electrode, and a separator that separates the positive electrode from the negative electrode. FIG. 4 is a perspective view schematically showing an electrode body of the secondary battery according to the first embodiment. FIG. 5 is a schematic view showing the configuration of the electrode body of the secondary battery according to the first embodiment. As shown in FIGS. 2 and 4, a positive electrode internal terminal 50 and a negative electrode internal terminal 60 are attached to the electrode body 20. The positive electrode internal terminal 50 is connected to the positive electrode external terminal 30 (see FIG. 1). The negative electrode internal terminal 60 is connected to the negative electrode external terminal 40 (see FIG. 1).

As shown in FIG. 5, the electrode body 20 has a positive electrode 22 and a negative electrode 24, Here, the electrode body 20 is a flat-shaped wound electrode body obtained by laminating a long strip-shaped positive electrode sheet 22 and a long strip-shaped negative electrode sheet 24 with a long strip-shaped separator 26 interposed therebetween, and winding the laminate around a winding axis WL orthogonal to the sheet longitudinal direction. As shown in FIG. 4, the electrode body 20 has a pair of rectangular surfaces 20a and a pair of end surfaces 20b in the width direction Y. The end surface 20b is a laminated surface of the positive electrode 22, the negative electrode 24, and the separator 26, and is open to the outside of the electrode body 20.

Although detailed illustration is omitted, the electrode body 20 is arranged inside an exterior body 12 in a direction such that the winding axis WL is parallel to the width direction Y. In the state of being accommodated in the battery case 10 shown in FIGS. 1 and 2, the pair of rectangular surfaces 20a of the electrode body 20 face the wide surface 12b of the battery case 10. Further, the pair of end surfaces 20b face the narrow surface 12c.

The positive electrode sheet 22 has a long strip-shaped positive electrode current collecting foil 22c (for example, an aluminum foil) and a positive electrode active material layer 22a fixedly attached on at least one surface of the positive electrode current collecting foil 22c. Although not particularly limited, a positive electrode protective layer 22p may be provided, if necessary, on one side edge of the positive electrode sheet 22 in the width direction Y. As the material constituting the positive electrode active material layer 22a and the positive electrode protective layer 22p, those used in this kind of secondary batteries can be used without particular limitation, and since the technique disclosed herein is not characterized thereby, detailed description thereof will be omitted.

A plurality of positive electrode tabs 22t is provided at one end (left end in FIG. 4) of the positive electrode current collecting foil 22c in the width direction Y. Each of the plurality of positive electrode tabs 22t projects toward one side (left side in FIG. 4) in the width direction. Y. The plurality of positive electrode tabs 22t are provided at intervals (intermittently) along the longitudinal direction of the positive electrode plate 22. The positive electrode tab 22t is a part of the positive electrode current collecting foil 22c, and is a portion (current collecting foil exposed portion) where the positive electrode active material layer 22a and the positive electrode protective layer 22p of the positive electrode current collecting foil 22c are not formed. The plurality of positive electrode tabs 22t are stacked at one end (left end in FIG. 4) in the width direction Y to form a positive electrode tab group 23. The positive electrode internal terminal 50 is joined to the positive electrode tab group 23 (see FIGS. 2 and 4).

The negative electrode sheet 24 has a long strip-shaped negative electrode current collecting foil 24c (for example, a copper foil) and a negative electrode active material layer 24a fixedly attached on at least one surface of the negative electrode current collecting foil 24c. As the material constituting the negative electrode active material layer 24a, those used in this kind of secondary batteries can be used without particular limitation, and since the technique disclosed herein is not characterized thereby, detailed description thereof is omitted.

A plurality of negative electrode tabs 24t is provided at one end (right end in FIG. 4) of the negative electrode current collecting foil 24c in the width direction Y. Each of the plurality of negative electrode tabs 24t projects toward one side (right side in FIG. 4) in the width direction Y. The plurality of negative electrode tabs 24t are provided at intervals (intermittently) along the longitudinal direction of the negative electrode plate 24. The negative electrode tab 24t is a part of the negative electrode current collecting foil 24c, and is a portion (current collecting foil exposed portion) where the negative electrode active material layer 24a of the negative electrode current collecting foil 24c is not formed. The plurality of negative electrode tabs 24t are stacked at one end (right end in FIG. 4) in the width direction Y to form a negative electrode tab group 25. The negative electrode internal terminal 60 is joined to the negative electrode tab group 25. (See FIGS. 2 and 4).

As shown in FIG. 4, the central region 201 of the electrode body 20 includes a center line C of the rectangular surface 20a of the electrode body 20 in the long side direction Y (hereinafter, the "width direction Y" is also referred to, as appropriate, as the "long side direction Y"). Here, "includes a center line C" means that the center line C may be included in the central region 201, and this meaning is inclusive of both the case where the center line of the region is the center line C and the case where the center line of the region is not the center line C. When the center line of the central region 201 is not the center line C, the distance between the center line of the central region 201 and the center line C may be set to be ¼ L2 or less (the length L2 will be described hereinbelow).

The ratio (L2/L1) of the length L1 of the rectangular surface 20a of the electrode body 20 in the long side direction Y and the length L2 of the central region 201 in the same direction can be, for example, ⅛ or more. From the viewpoint of reducing uneven drying, the ratio is preferably ⅙ or more, and more preferably ¼ or more. The ratio (L2/L1) can be, for example, ½ or less. From the viewpoint of reducing uneven drying, the ratio is preferably ⅖ or less, and more preferably ⅓ or less.

The study conducted by the present inventor made it clear that the larger the length L1 is, the more likely the uneven drying is to occur. The effect of the technique disclosed herein can be preferably realized in the manufacture of a secondary battery having an electrode body having the length L1 of 100 mm or more. Further, even if the length L1 is 200 mm or more, 250 mm or more, or 300 mm or more, the effect of the technique disclosed herein can be preferably realized. The length L1 is not particularly limited, but can be, for example, 1000 mm or less.

The method for manufacturing the secondary battery 100 includes at least the following steps (1) and (2):

(1) Battery assembly production step; and
(2) Drying step.

(1) in the battery assembly production step, the electrode body is accommodated in the battery case to produce a battery assembly. This step may include producing a combined product of the electrode body 20 and the lid 14, accommodating the combined product in the case body 12, and sealing the case body 12. Although there is no intention of limiting this step, first, the electrode body 20 is produced by a conventional well-known method. Next, the positive electrode internal terminal 50 is attached to the positive electrode tab group 23 of the electrode body 20, and the negative electrode internal terminal 60 is further attached to the negative electrode tab group 25 to prepare a combined product (first combined product) of the electrode body and the internal terminal. Next, the first combined product and the lid 14 are integrated to prepare a second combined product. Specifically, for example, the positive electrode external terminal 30 attached in advance to the lid 14, and the positive electrode internal terminal 50 of the first combined product are joined. Similarly, the negative electrode external terminal 40 attached in advance to the lid 14, and the negative electrode internal terminal 60 of the first combined product are joined. As the joining means, for example, ultrasonic joining, resistance welding, laser welding, and the like can be used.

Next, the second combined object is accommodated in the case body 12. Specifically, for example, the electrode body 20 is accommodated in an electrode body holder 70 prepared by bending an insulating resin sheet (for example, made of a polyolefin such as polyethylene (PE)) into a hag shape or a box shape. Then, the electrode body 20 covered with the electrode body holder 70 is inserted into the case body. In this state, the lid 14 is superposed on the opening of the case body 12, and the case body 12 and the lid 14 are welded together. In this way, the case body 12 is sealed to produce a battery assembly.

(2) In the drying step, the inside of the battery assembly is dried. Although not particularly limited, the battery assembly may be dried, for example, by using a drying chamber. Specifically, for example, first, a battery assembly and a heating element (plate heater, electric heating heater, and the like) are accommodated in the drying chamber, and the heating element is switched on to heat the inside of the drying chamber. It is preferable to heat the drying chamber to a predetermined temperature and maintain the reached temperature for a predetermined time (for example, 10 min to 4 h). The temperature is not particularly limited as long as moisture inside of the battery assembly can be sufficiently removed, but the temperature may be set to, for example, 100° C. or higher and 150° C. or lower.

At this time, the inside of the drying chamber may be depressurized. For example, a vacuum pump is connected to the drying chamber, and the vacuum pump is switched on to depressurize the inside of the drying chamber. It is preferable to reduce the pressure in the drying chamber until the pressure in the drying chamber drops to a predetermined pressure, and maintain the reached pressure for a predetermined time (for example, 1 h to 3 h). The pressure is not particularly limited, and can be, for example, −0.05 MPa or less, −0.08 MPa or less, and −0.09 MPa or less with respect to atmospheric pressure (0.1 MPa), and may be a lower pressure.

After the drying step, the heating element is switched off to lower the temperature inside the drying chamber and the temperature of the battery assembly. When the pressure inside the drying chamber is reduced, the vacuum pump is switched off to increase the pressure inside the drying chamber until the pressure becomes about the same as the atmospheric pressure.

The battery assembly is taken out of the drying chamber, and an electrolytic solution is injected into the battery case 10 through the injection hole 15 by a conventional well-known method. After that, the liquid injection hole 15 is sealed with a sealing plug 16 to obtain the secondary battery 100. Then, under predetermined conditions, the secondary battery 100 can be put into a usable state by performing initial charging and aging treatment.

The secondary battery 100 can be used for various purposes. Suitable applications include a drive power supply mounted on a vehicle such as a battery electric vehicle (BEV), a hybrid electric vehicle (HEV), and a plug-in hybrid electric vehicle (PHEV). Further, the secondary battery 100 can be used as a storage battery for a small power storage device or the like. The secondary battery 100 may also be used in the form of a battery pack, which typically consists of a plurality of batteries connected in series and/or in parallel.

Hereinafter, a test example conducted by the present inventor will be described.

Construction of Battery Assembly

NCM as a positive electrode active material, PVdF as a binder, and acetylene black as a conductive material were weighed so as to have mass ratios of 98:1:1 and mixed in N-methyl-2-pyrrolidone (NMP) to prepare a positive electrode slurry. This positive electrode slurry was applied to both sides of a long strip-shaped positive electrode current collector (aluminum foil) and dried. This was cut into a predetermined size and rolled by a roll press to obtain a positive electrode sheet having positive electrode active material layers on both sides of the positive electrode current collector.

Graphite powder as a negative electrode active material, styrene-butadiene rubber as a binder, and carboxymethyl cellulose as a thickener were weighed so as to have mass ratios of 98:1:1 and mixed in water to prepare a negative electrode slurry. This negative electrode slurry was applied to both sides of a long strip-shaped negative electrode current collector (copper foil) and dried. This was cut into a predetermined size and rolled by a roll press to obtain a negative electrode sheet having negative electrode active material layers on both sides of the negative electrode current collector. Next, the produced positive electrode sheet and negative electrode sheet were laminated so as to face each other with a polyethylene separator sheet being interposed therebetween. The laminate was wound in the longitudinal direction of the sheet to produce a wound electrode body as shown in FIG. 4.

Next, an aluminum lead as a positive electrode internal terminal was welded to the positive electrode sheet (positive electrode tab group), and a nickel lead as a negative electrode internal terminal was welded to the negative electrode sheet (negative electrode tab group). The dimensional relationship of the electrode body was as follows:

W: 11.6 mm±0.2 mm;
L1: 332 mm±1.6 mm;
H1: 94 mm±0.25 mm; and
H2: 81 mm.

The reference symbols are as shown in FIG. 4. Specifically, W is the thickness of the electrode body 20. L1 is the width of the electrode body 20. H1 is the height of the electrode body 20. H2 is the height of the rectangular surface 20a of the electrode body 20. Further, the above dimensions are average values obtained by producing three electrode bodies.

Next, the electrode body and the lid of the battery case were connected with the positive electrode internal terminal and the negative electrode internal terminal interposed therebetween. This was inserted into the case body, and the case body and the lid were welded together. In this way, a battery assembly for testing was constructed.

Drying the Battery Assembly

Next, the test battery assembly was accommodated in a drying chamber equipped with a plate heater. In the drying chamber, the test battery assembly was placed on the plate heater. Next, the switch of the vacuum pump connected to the drying chamber and the switch of the plate heater were turned on to reduce the pressure in the drying chamber to a predetermined pressure and heat the inside of the drying chamber to a predetermined temperature. Then, the depressurized state and the heated state were maintained for a predetermined time. After the lapse of the predetermined time, the vacuum pump switch and the plate heater switch were turned off to increase the pressure and cool the inside of the drying chamber. The test battery assembly was then removed from the drying chamber.

Moisture Measurement

The amount of moisture in the test battery assembly before and after drying was measured to evaluate the dry state in the test battery assembly, Specifically, first, a 2 cm×2 cm test piece was cut out from the positive electrode sheet of the test battery assembly before and after drying in the dry room. Regarding the preparation of the test piece, the rectangular surface 20a of the electrode body 20 was divided into three regions (left end region 202, central region 201, and right end region 203) in the long side direction Y (see FIG. 4), and three test pieces were cut out from each region. The lengths of the three regions in the same direction were ⅓ L1.

Next, the amount of moisture in the above test pieces was measured using a Karl Fischer moisture measuring device. The heating temperature at the time of measurement was 150° C. By comparing the amount of moisture before and after drying in each region, it was confirmed that a certain amount of moisture was removed from the electrode body by drying. In the "Remaining amount of moisture" column of Table 1, a relative value of the remaining amount of moisture in each region (that is, the amount of moisture after drying) is shown by taking the remaining amount of moisture in the right end region as 1. The numerical values shown in Table 1 were calculated using the average values obtained by using the measured values of the three test pieces cut out from each of the above regions.

TABLE 1

| Measurement region | Remaining amount of moisture |
| --- | --- |
| Left end region | 1 |
| Central region | 1.2 |
| Right end region | 1 |

From the results shown in Table 1, the remaining amount of moisture in the central region of the electrode body after drying was larger than that in the other regions (that is, the end regions) other than the central region. That is, it was found that the electrode body of the test battery assembly had uneven drying.

In the secondary battery disclosed herein, the battery case 10 is provided with protrusions 13 inside. The protrusion 13 is in contact with at least a part of the central region 201 including the center line C in the long side direction Y of the rectangular surface 20a of the electrode body 20 accommodated in the battery case 10. When the battery case 10 is provided with the protrusions 13 as described above, the heat transfer efficiency to the central region 201 of the electrode body 20 can be selectively increased in the drying step of the battery assembly at the time of manufacturing the secondary battery. Therefore, it is possible to promote the removal of moisture from the region and suppress the occurrence of uneven drying in the electrode body 20.

Regarding the drying of the wound electrode body, the moisture in the wound electrode body is removed from the laminated surfaces of the electrode body (end surfaces 20b in FIG. 4) open to the outside. In the wound electrode body, as shown in the example of study conducted by the present inventor, moisture remains in the central region, and uneven drying is likely to occur. By applying the technique disclosed herein to the manufacture of a secondary battery including a wound electrode body, it is possible to suppress the occurrence of uneven drying in the wound electrode body.

The above-mentioned first embodiment is only an example of the secondary battery disclosed herein. The techniques disclosed herein can be implemented in other forms. Hereinafter, other embodiments of the technique disclosed herein will be described.

SECOND EMBODIMENT

Figure 6:
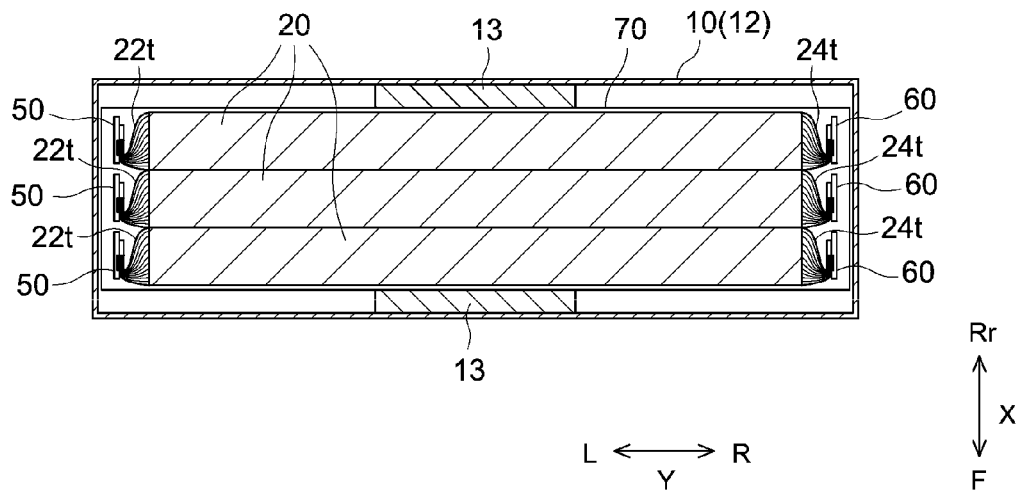
FIG. 6 is a cross-sectional vi showing the configuration of the secondary battery according to the second embodiment.

In the first embodiment, as shown in FIG. 2, the secondary battery 100 includes one electrode body 20. However, the number of electrode bodies included in the secondary battery disclosed herein is not limited to one. That is, the secondary battery disclosed herein may include a plurality (two or more) of electrode bodies. FIG. 6 is a cross-sectional view showing the configuration of the secondary battery according to the second embodiment. As shown in FIG. 6, a secondary battery 200 according to the second embodiment includes a plurality of electrode bodies 20. The plurality of electrode bodies 20 are accommodated in the battery case 10 (case body 12) in a state of being arranged in a predetermined direction (depth direction X in FIG. 6), The plurality of electrode bodies 20 are accommodated in the battery case 10 in a state of being arranged in the abovementioned direction and accommodated in the electrode body holder 70. The protrusions 13 are in contact with the electrode bodies 20 at both ends in the arrangement direction (depth direction X). With such a configuration, the heat transfer efficiency to the central region of each electrode body 20 can be selectively increased in the drying step of the battery assembly. Therefore, the occurrence of uneven drying can be suppressed. In FIG. 6, the number of electrode bodies 20 is set to three for convenience, but this number is not limiting. Further, the secondary battery 200 according to the second embodiment may be the same as the secondary battery 100 according to the first embodiment, except for the above-mentioned points. In FIG. 6, reference numeral 221 indicates a "positive electrode tab", reference numeral 24t indicates a "negative electrode tab", reference numeral 50 indicates a "positive electrode internal terminal", and reference numeral 60 indicates a "negative electrode internal terminal".

THIRD EMBODIMENT

Figure 7:
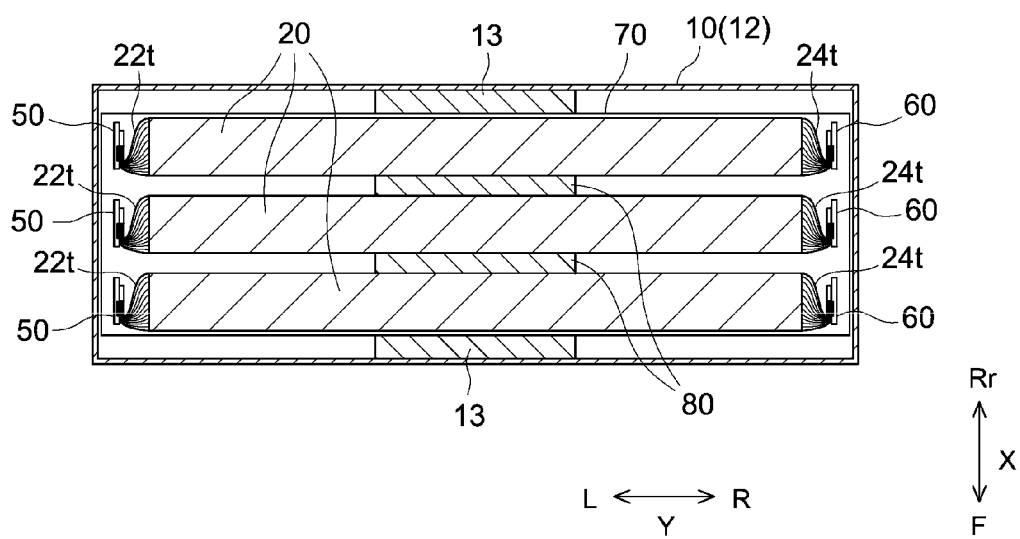
FIG. 7 is a cross-sectional view showing the configuration of the secondary battery according to the third embodiment.

In the second embodiment, the protrusions 13 are in contact with only the electrode bodies 20 at both ends in the arrangement direction (depth direction X) among the plurality of electrode bodies 20 accommodated in the battery case 10. However, this configuration is not limiting. FIG. 7 is a cross-sectional view showing the configuration of the secondary battery according to the third embodiment. As shown in FIG. 7, a secondary battery 300 according to the third embodiment includes a plurality of electrode bodies 20, and insert members 80 are provided between the electrode bodies 20. The insert member 80 is in contact with at least a part of the central region 201 (see FIG. 4) of the electrode body 20 adjacent to the insert member. The plurality of electrode bodies 20 are arranged in a predetermined direction (depth direction X in FIG. 7) with the insert members 80 interposed therebetween, and are accommodated in the battery case 10 in a state of being accommodated in the electrode body holder 70. The protrusions 13 are in contact with the electrode bodies 20 at both ends in the arrangement direction (depth direction X).

The insert member 80 is made of, for example, a metal, but such a feature is not limiting. Examples of the metal material constituting the insert member 80 include aluminum, aluminum alloy, iron, iron alloy and the like. The constituent material of the insert member 80 may be the same as or different from the constituent material of the battery case 10 and the protrusion 13. By using the insert member 80, the efficiency of selective heat conduction to the central region of each electrode body 20 in the drying step of the battery assembly can be further enhanced. Therefore, the occurrence of uneven drying can be suppressed to a higher degree. In FIG. 7, the number of electrode bodies 20 is set to three for convenience, but the number is not limited to this. Further, the secondary battery 300 according to the third embodiment ay be the same as the secondary battery 100 according to the first embodiment, except for the above-mentioned points. In FIG. 7, reference numeral 22t indicates a "positive electrode tab", reference numeral 24t indicates a "negative electrode tab", reference numeral 50 indicates a "positive electrode internal terminal", and reference numeral 60 indicates a "negative electrode internal terminal".

OTHER MODIFICATION EXAMPLES

The protrusion 13 in the above embodiment is formed on the wide surface portion 11b of the plate material 11 (see FIG. 3). However, since the protrusion 13 may be provided so as to come into contact with the central region 201 of the electrode body 20, this configuration is not limiting. For example, the protrusion may be formed on the bottom surface portion 11a of the plate material 11. Further, in the above embodiment, the protrusion 13 and the plate material 11 which are separate bodies are integrated by joining, but the present invention is not limited to this, and the protrusion and the plate material are not necessarily integrated. Further, in the above embodiment, the case body 12 is produced by punching one plate material 11 into a predetermined shape. However, the present invention is not limited to this, and the case body 12 may be produced by combining a plurality of plate materials. Alternatively, the case body 12 may be manufactured by deep drawing.

The specific examples of the technique disclosed herein have been described in detail hereinabove, but these are merely examples and do not limit the scope of claims. The technique disclosed herein is inclusive of various changes and modifications of the above specific examples. For example, the technique disclosed herein can also be applied to a sodium ion secondary battery. The technique disclosed herein an also be applied to a secondary battery including a laminated electrode body.

What is claimed is:
1. A secondary battery comprising:
an electrode body comprising a positive electrode, a negative electrode, and a separator that separates the positive electrode and the negative electrode and comprising at least a pair of rectangular surfaces, and
a battery case that accommodates the electrode body, wherein
the battery case consists of metal and is formed in a hexagonal box shape comprising a pair of rectangular wide flat surfaces and four rectangular flat side surfaces between the pair of wide flat surfaces;
the electrode body is accommodated in the battery case, wherein the rectangular surfaces of the electrode body face the wide flat surfaces of the battery case;
the battery case comprises a protrusion inside, the protrusion consisting of metal and the protrusion being a separate body from the battery case and disposed on one of the wide flat surfaces of the battery case; and
the protrusion is in contact with at least a part of a central region of the electrode body accommodated in the battery case, wherein the central region includes a center line in the long side direction of the rectangular surface of the electrode body.
2. The secondary battery according to claim 1, wherein a ratio (L2/L1) of a length L2 in the long side direction of the central region to a length L1 in the long side direction of the rectangular surface of the electrode body is ⅛ or more and ½ or less.
3. The secondary battery according to claim 2, wherein the length L1 is 100 mm or more.
4. The secondary battery according to claim 1, wherein the positive electrode is a long strip-shaped positive electrode sheet;

the negative electrode is a long strip-shaped negative electrode sheet;

the electrode body is a wound electrode body in which the positive electrode sheet and the negative electrode sheet are laminated with the separator interposed therebetween and are wound around a winding axis orthogonal to the longitudinal direction of the sheets; and the laminated surfaces of the positive electrode sheet, the negative electrode sheet, and the separator are open to the outside of the electrode body from both ends in the winding axis direction.

5. The secondary battery according to claim 1, comprising a plurality of electrode bodies, wherein the plurality of electrode bodies are arranged in a direction, and accommodated in the battery case, and the protrusion is one of a plurality of protrusions that are in contact with the electrode bodies at both ends in the arrangement direction.

6. The secondary battery according to claim 5, comprising an insert member provided between the electrode bodies, wherein the insert member is in contact with at least a part of the central region of the electrode body adjacent to the insert member.

* * * * *